Sept. 22, 1925.　　　　　　　　　　　　1,554,755

F. W. PARSONS

CLUTCH COUPLING

Filed July 23, 1924

INVENTOR
Frederick W. Parsons
BY
Herbert␣␣␣␣␣
HIS ATTORNEY

Patented Sept. 22, 1925.

1,554,755

UNITED STATES PATENT OFFICE.

FREDERICK W. PARSONS, OF ELMIRA, NEW YORK, ASSIGNOR TO INGERSOLL-RAND COMPANY, OF JERSEY CITY, NEW JERSEY, A CORPORATION OF NEW JERSEY.

CLUTCH COUPLING.

Application filed July 23, 1924. Serial No. 727,630.

*To all whom it may concern:*

Be it known that I, FREDERICK W. PARSONS, a citizen of the United States, and a resident of Elmira, county of Chemung, State of New York, have invented a certain Clutch Coupling, of which the following is a specification, accompanied by drawings.

This invention relates to clutch couplings, but more particularly to a coupling of the frictional type for coupling two shafts together, a driving shaft and a driven shaft, although the coupling may be used in any operative connection to which it may be found applicable. One advantageous use of the invention for instance is in connection with portable compressor units in which the source of power, as a combustion engine, is coupled to the compressor.

The objects of the invention are to enable the driving and driven shafts to be readily and quickly coupled or uncoupled by simple and inexpensive coupling which may conveniently be located within the fly wheel, so that the fly wheel forms part of the coupling if desired.

Figure 1:
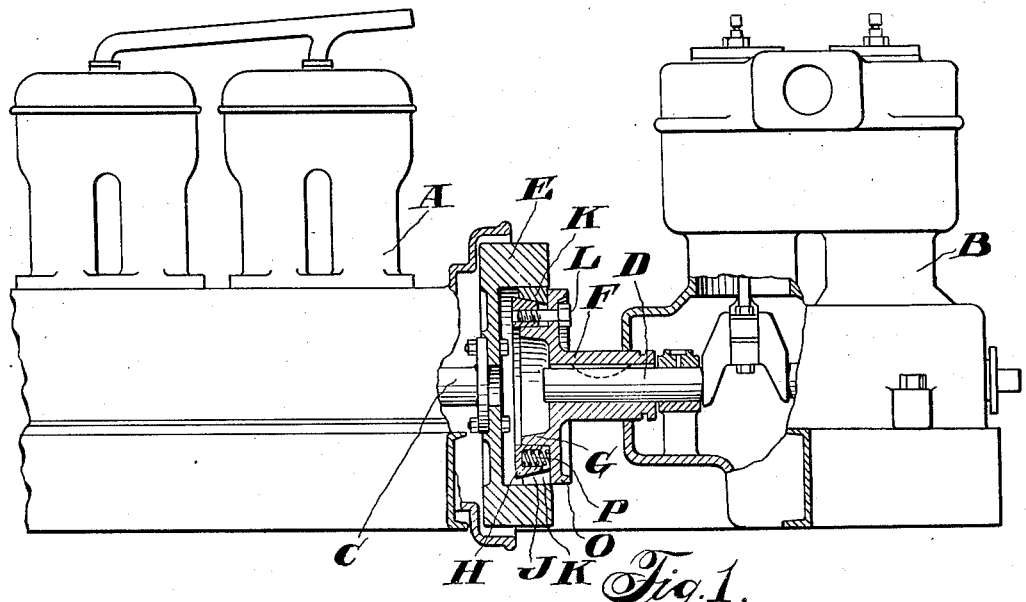
Figure 2:
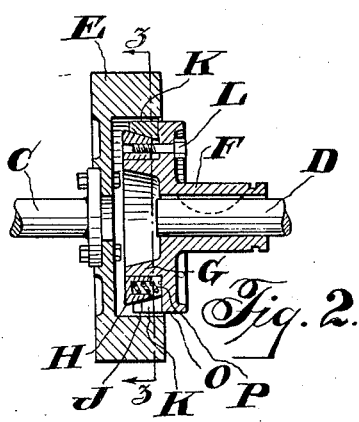
Figure 3:
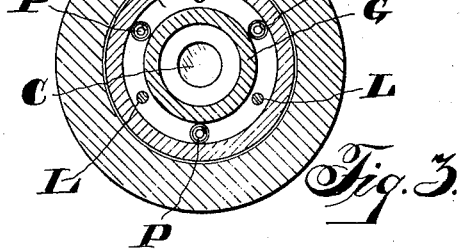
Figure 4:
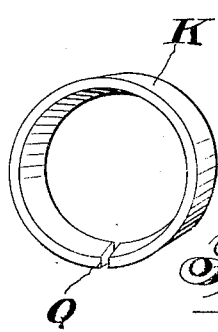

To these ends the invention is illustrated in the accompanying drawings, in which Figure 1 is a side elevation partly in longitudinal section of a power unit showing the coupling in coupled position, Figure 2 is a longitudinal sectional detail elevation of a coupling showing the parts in uncoupled position, Figure 3 is a transverse sectional view of Figure 2 on the line 3—3, and Figure 4 is a detail perspective view of the split coupling ring.

Referring to the drawings, Figure 1 for purposes of illustration shows only so much of a portable air compressing unit as will serve to illustrate the invention. The unit comprises a combustion engine A of any suitable type operatively connected to drive a compressor B. The engine shaft C is coupled to the compressor shaft D by means of the improved clutch coupling.

The clutch coupling comprises two rotary members to be coupled together, one carried by the engine shaft C and the other by the compressor shaft D. In this instance, the fly wheel E connected to the engine shaft C is utilized as one of the members, while the other member is in the form of a hub F having a flanged portion G extending within the fly wheel E. The hub F may be suitably keyed to the compressor shaft D or otherwise secured thereto.

One of the two rotary members E and F carries a clutch ring and in this instance, the clutch ring H is carried by the hub F and slides longitudinally on the flanged portion G of the hub. The clutch ring is preferably beveled at its outer face J so that in cross section the clutch ring is of a wedge shaped form.

A coupling ring K also preferably wedge shaped in cross section is located between the clutch ring H and the other rotary member to be coupled, which in this instance is the fly wheel E. The split coupling ring K preferably lies between the clutch ring H and the inner periphery of the rim of the fly wheel E.

Means are provided for adjusting the clutch ring H on the flanged portion of the hub F and for this purpose adjusting bolts L extend through the body portion O of the hub and are screw threaded into the clutch ring H so that upon tightening the bolts, the clutch ring is drawn longitudinally towards the body portion O of the hub and the coupling ring K is expanded into engagement with the rim of the fly wheel E in order to couple the parts together.

Springs P are preferably inserted between the clutch ring H and the body portion of the hub and abutting against the inner surface of the hub in order to automatically return the clutch ring H to uncoupled position when the bolts L are loosened. In constructing the coupling ring K, a split ring is made by sawing the ring at the point Q, indicated in Figure 4, and then the ring is preferably expanded, care being taken that its shape shall be circular when expanded. The ring is then turned to fit the fly wheel E in such manner that when the ring is contracted, as indicated in Figure 2, it does not touch the fly wheel which is free to turn outside the ring. Upon tightening the adjusting bolts L the wedge shaped clutch ring H is forced into the coupling ring K and expands the coupling ring into engagement with the fly wheel or other rotary part to be coupled.

I claim:

1. A clutch coupling comprising an outer rotary member and an inner hub to be coupled together, the hub carrying a longitudinally slidable clutch ring, a coupling ring located between the clutch ring and the outer rotary member and abutting against the inner surface of a flange on said hub, bolts for adjusting the clutch ring to cause the coupling ring to couple the parts together, and compression springs between the hub and clutch ring for returning the clutch ring to uncoupled position.

2. A clutch coupling comprising a hub and a fly wheel to be coupled together, the hub carrying a longitudinally slidable clutch ring wedge shaped in cross section, a split coupling ring located between the clutch ring and the inner periphery of the fly wheel and abutting against the inner surface of a flange on said hub, bolts for adjusting the clutch ring longitudinally on the hub to cause expansion of the split coupling ring into engagement with the fly wheel, and compression springs between the hub and clutch ring for returning the clutch ring to uncoupled position when the bolts are loosened.

In testimony whereof I have signed this specification.

FREDERICK W. PARSONS.